(12) United States Patent
Chandrashekar et al.

(10) Patent No.: US 11,140,044 B1
(45) Date of Patent: Oct. 5, 2021

(54) UTILIZING MODELS FOR CONCURRENTLY DISCOVERING NETWORK RESOURCES OF A NETWORK

(71) Applicant: Juniper Networks, Inc., Sunnyvale, CA (US)

(72) Inventors: A. Chandrashekar, Bangalore (IN); Bhaskar T. Reddy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/248,511

(22) Filed: Jan. 28, 2021

(30) Foreign Application Priority Data

Oct. 15, 2020 (IN) .............................. 202041044888

(51) Int. Cl.
*G06F 15/173* (2006.01)
*H04L 12/24* (2006.01)

(52) U.S. Cl.
CPC .......... *H04L 41/12* (2013.01); *H04L 41/0823* (2013.01); *H04L 41/0893* (2013.01)

(58) Field of Classification Search
CPC .. H04L 41/12; H04L 41/0823; H04L 41/0893
See application file for complete search history.

(56) References Cited

U.S. PATENT DOCUMENTS

| 10,011,180 | B2* | 7/2018 | Hyde | ...................... B60L 53/52 |
| 2007/0111757 | A1* | 5/2007 | Cao | ...................... H04W 52/343 455/561 |
| 2015/0195726 | A1* | 7/2015 | Bhatia | ...................... H04W 24/08 455/67.11 |

* cited by examiner

*Primary Examiner* — Thanh T Nguyen
(74) *Attorney, Agent, or Firm* — Harrity & Harrity, LLP

(57) ABSTRACT

A device may receive network data associated with network devices, and may process the network data, with a first model, to determine a first queue identifying first discovery tasks to execute for the network devices and a second queue identifying second discovery tasks to execute for the network devices. The device may process the first queue and the second queue, with a second model, to determine a schedule for executing the first and second discovery tasks, and may execute the first and second discovery tasks based on the schedule. The device may calculate progress of the executions of the first discovery tasks and the second discovery tasks, and may estimate time intervals associated with completions of the executions of the first discovery tasks and the second discovery tasks. The device may provide, to a user device, information identifying the progress and the time intervals.

20 Claims, 10 Drawing Sheets

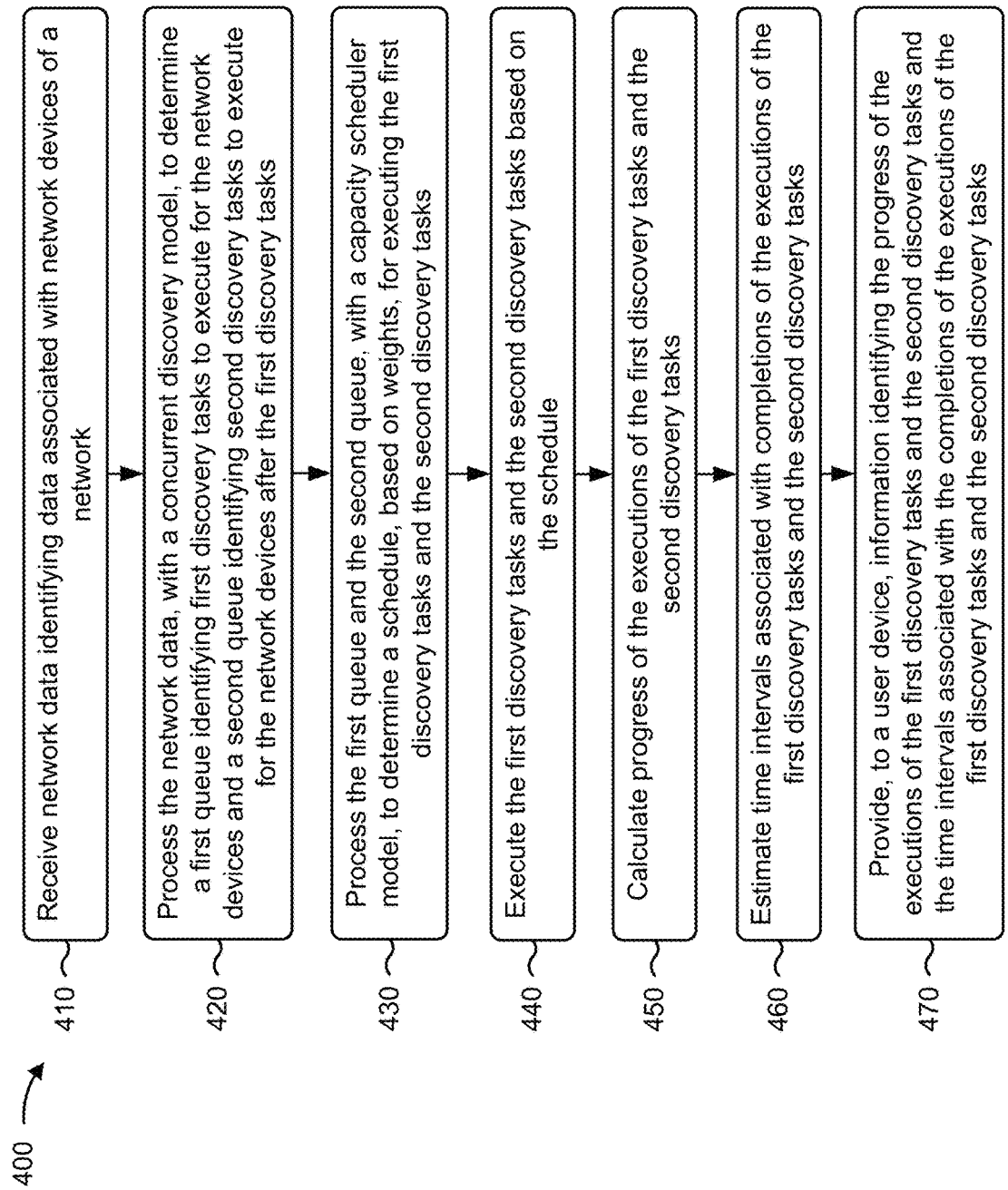

UTILIZING MODELS FOR CONCURRENTLY DISCOVERING NETWORK RESOURCES OF A NETWORK

CROSS-REFERENCE TO RELATED APPLICATION

This application claims priority to Indian Provisional Application No. 202041044888 entitled "UTILIZING MODELS FOR CONCURRENTLY DISCOVERING NETWORK RESOURCES OF A NETWORK," filed on Oct. 15, 2020. The entire content of which is expressly incorporated herein by reference.

BACKGROUND

A network management system is a system designed for monitoring, maintaining, and optimizing a network. The network management system may include hardware and software for managing the network, and may provide multiple services.

SUMMARY

In some implementations, a method may include receiving network data identifying data associated with network devices of a network, and processing the network data, with a concurrent discovery model, to determine a first queue identifying first discovery tasks to execute for the network devices and a second queue identifying second discovery tasks to execute for the network devices after the first discovery tasks. The method may include processing the first queue and the second queue, with a capacity scheduler model, to determine a schedule, based on weights, for executing the first discovery tasks and the second discovery tasks, and executing the first discovery tasks and the second discovery tasks based on the schedule. The method may include calculating progress of the executions of the first discovery tasks and the second discovery tasks, and estimating time intervals associated with completions of the executions of the first discovery tasks and the second discovery tasks. The method may include providing, to a user device, information identifying the progress of the executions of the first discovery tasks and the second discovery tasks and the time intervals associated with the completions of the executions of the first discovery tasks and the second discovery tasks.

In some implementations, a device may include one or more memories, and one or more processors to receive network data identifying data associated with network devices of a network, and process the network data, with a concurrent discovery model, to determine a first queue identifying first discovery tasks to execute for the network devices and a second queue identifying second discovery tasks to execute for the network devices after the first discovery tasks. The one or more processors may process the first queue and the second queue, with a capacity scheduler model, to determine a schedule, based on weights, for executing the first discovery tasks and the second discovery tasks, and may execute the first discovery tasks and the second discovery tasks based on the schedule. The one or more processors may calculate progress of the executions of the first discovery tasks and the second discovery tasks, and may estimate time intervals associated with completions of the executions of the first discovery tasks and the second discovery tasks. The one or more processors may provide, to a user device, information identifying the progress of the executions of the first discovery tasks and the second discovery tasks and the time intervals associated with the completions of the executions of the first discovery tasks and the second discovery tasks, and may complete the executions of the first discovery tasks and the second discovery tasks. The one or more processors may receive additional network data based on completions of the executions of the first discovery tasks and the second discovery tasks, and may store the additional network data in a data structure.

In some implementations, a non-transitory computer-readable medium may store a set of instructions that includes one or more instructions that, when executed by one or more processors of a device, cause the device to receive network data identifying data associated with network devices of a network, and process the network data, with a concurrent discovery model, to determine a first queue identifying first discovery tasks to execute for the network devices and a second queue identifying second discovery tasks to execute for the network devices after the first discovery tasks. The one or more instructions may cause the device to process the first queue and the second queue, with a capacity scheduler model, to determine a schedule, based on weights, for executing the first discovery tasks and the second discovery tasks, and execute the first discovery tasks and the second discovery tasks based on the schedule. The one or more instructions may cause the device to receive additional network data based on executing the first discovery tasks and the second discovery tasks, wherein a first portion of the additional network data is associated with known resources of network devices, and wherein a second portion of the additional network data is associated with unknown resources of network devices. The one or more instructions may cause the device to store the additional network data in a data structure.

BRIEF DESCRIPTION OF THE DRAWINGS

FIG. 4 is a flowchart of an example process for utilizing models for concurrently discovering network resources of network.

DETAILED DESCRIPTION

Figure 1A:
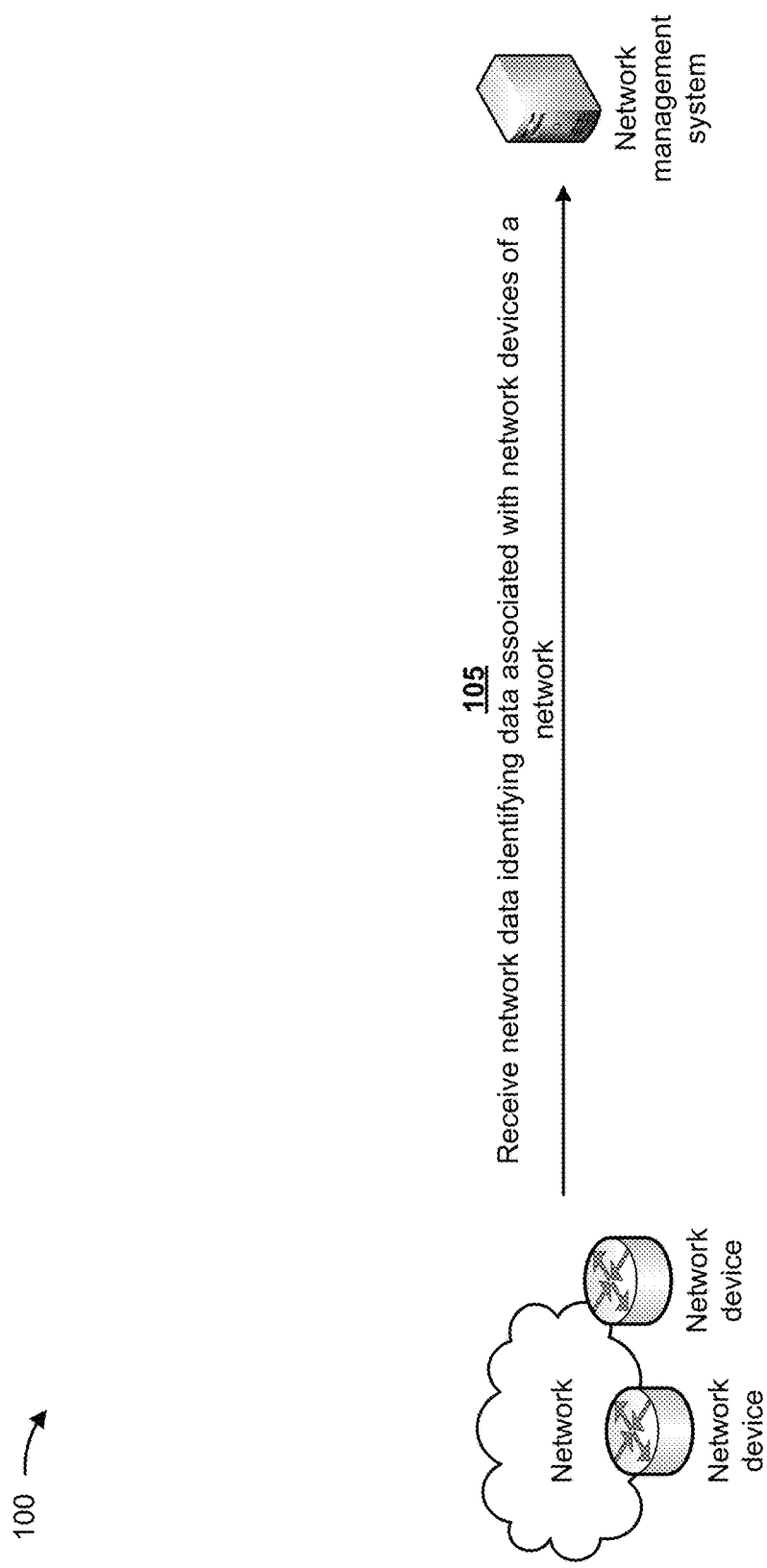
FIGS. 1A-1G are diagrams of an example implementation described herein.

The following detailed description of example implementations refers to the accompanying drawings. The same reference numbers in different drawings may identify the same or similar elements.

A network management system may execute discovery tasks to discover network data associated with resources (e.g., network devices) of a network. While executing the discovery tasks, the network management system imports information about the network devices. The quantity of network devices may be in hundreds, thousands, and/or the like. Thus, executing the discovery tasks and importing the information about the network devices may be time consuming, inefficient, and expensive. Further, executing the discovery tasks and importing the information about the network devices wastes computing resources (e.g., processing resources, memory resources, communication resources, and/or the like), and/or the like associated with determining the discovery tasks, executing the discovery tasks, storing the information about the network devices, and/or the like.

Some implementations described herein relate to a network management system that utilizes models for concurrently discovering network resources of network. For example, the network management system may receive network data identifying data associated with network devices of a network, and may process the network data, with a concurrent discovery model, to determine a first queue identifying first discovery tasks to execute for the network devices and a second queue identifying second discovery tasks to execute for the network devices after the first discovery tasks. The network management system may process the first queue and the second queue, with a capacity scheduler model, to determine a schedule, based on weights, for executing the first discovery tasks and the second discovery tasks, and may execute the first discovery tasks and the second discovery tasks based on the schedule. The network management system may calculate progress of the executions of the first discovery tasks and the second discovery tasks, and may estimate time intervals associated with completions of the executions of the first discovery tasks and the second discovery tasks. The network management system may provide, to a user device, information identifying the progress of the executions of the first discovery tasks and the second discovery tasks and the time intervals associated with the completions of the executions of the first discovery tasks and the second discovery tasks.

In this way, the network management system utilizes models for concurrently discovering network resources of network. The network management system may provide concurrent network resource discovery, and may schedule discovery tasks based on capacity requirements of the discovery tasks. The network management system may efficiently match and update the information about the network devices in a data structure, and may calculate a network resource discovery time associated with the discovery tasks. This, in turn, conserves computing resources, human resources, and/or the like that would otherwise have been wasted in determining the discovery tasks, executing the discovery tasks, storing the information about the network devices, and/or the like.

FIGS. 1A-1G are diagrams of an example 100 associated with utilizing models for concurrently discovering network resources of network. As shown in FIGS. 1A-1G, example 100 includes a user device and an enterprise system associated with a user and a network management system. The user device may include a laptop computer, a mobile telephone, a desktop computer, and/or the like utilized by the user. The enterprise system may include a device that collects and/or determines product/service data identifying products and services to be offered by the user. The network management system may include a system that utilizes models for concurrently discovering network resources of network.

As shown in FIG. 1A, and by reference number 105, the network management system receives network data identifying data associated with network devices of a network. For example, the network management system may receive the network data from the network devices and/or from a data structure (e.g., a database, a table, a list, and/or the like) associated with the network and the network devices. In some implementations, the network management system provides a request or requests for the network data to the network devices and/or the data structure, and receives the network data based on the request or requests. The network data may include preliminary data identifying network addresses associated with the network devices, data that enables the network management system to execute discovery tasks associated with discovering detailed data associated with the network devices, data identifying dependencies associated with resources (e.g., policies, network address translation, application firewalls, and/or the like) of the network devices, and/or the like.

Figure 1B:
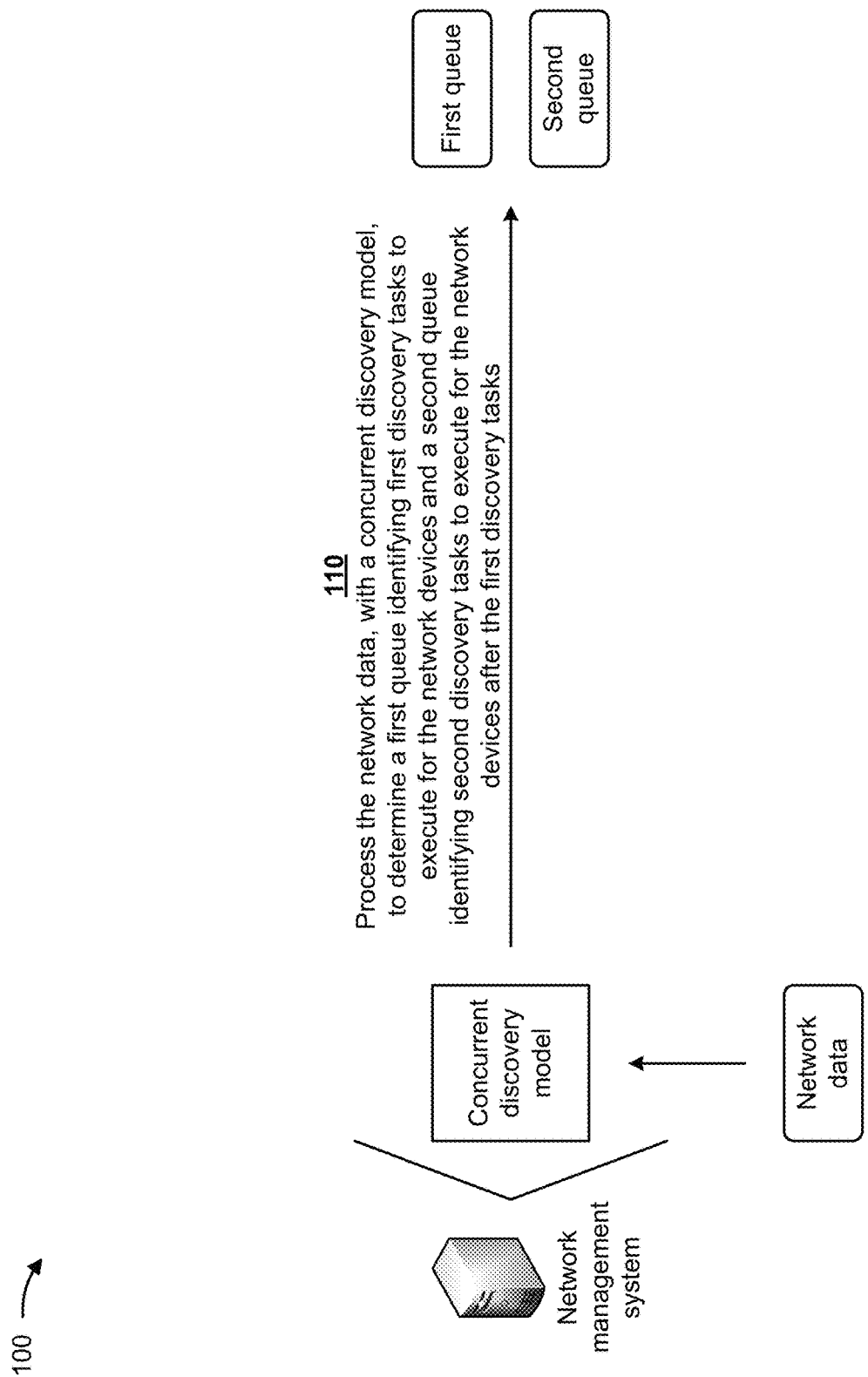

As shown in FIG. 1B, and by reference number 110, the network management system may process the network data, with a concurrent discovery model, to determine a first queue identifying first discovery tasks to execute for the network devices and a second queue identifying second discovery tasks to execute for the network devices after the first discovery tasks. The first discovery tasks may include discovery tasks, associated with first network devices without dependencies, to be executed to discover data associated with the first network devices. The second discovery tasks may include discovery tasks, associated with second network devices with dependencies, to be executed to discover data associated with the second network devices. In some implementations, the first queue and the second queue are determined in order to enable the network management system to concurrently discover data about the network devices.

In some implementations, the resources of the network devices include hierarchical dependencies, and the network management system, via the concurrent discovery model, considers the hierarchical dependencies while discovering the data about the network devices. The network management system may utilize the concurrent discovery model to identify the dependencies associated with the resources of the network devices based on the network data, and to generate a resource discovery dependency graph based on the dependencies. For every network device, the network management system may create a vertex in the resource discovery dependency graph. If a first network device is dependent on the second network device, the network management system may add a dependency edge between the first network device and the second network device in the resource discovery dependency graph.

The first queue may include a queue of discovery tasks to be executed, and the second queue may include a queue of pending discovery tasks to be executed after the discovery tasks in the first queue. The network management system may allocate the first discovery tasks, associated with network devices that are not dependent on other network devices, to the first queue. The network management system may allocate the second discovery tasks, associated with network devices that depend on one or more other network devices, to the second queue. The network management system may create threads for the first discovery tasks allocated to the first queue. When executions of the first discovery tasks are completed, the network management system may update dependencies for the network devices associated with the second discovery tasks allocated to the second queue. When an updated dependency for a particular second discovery task is zero, the network management system may move the particular second discovery task from the second queue to the first queue for execution.

Figure 1C:
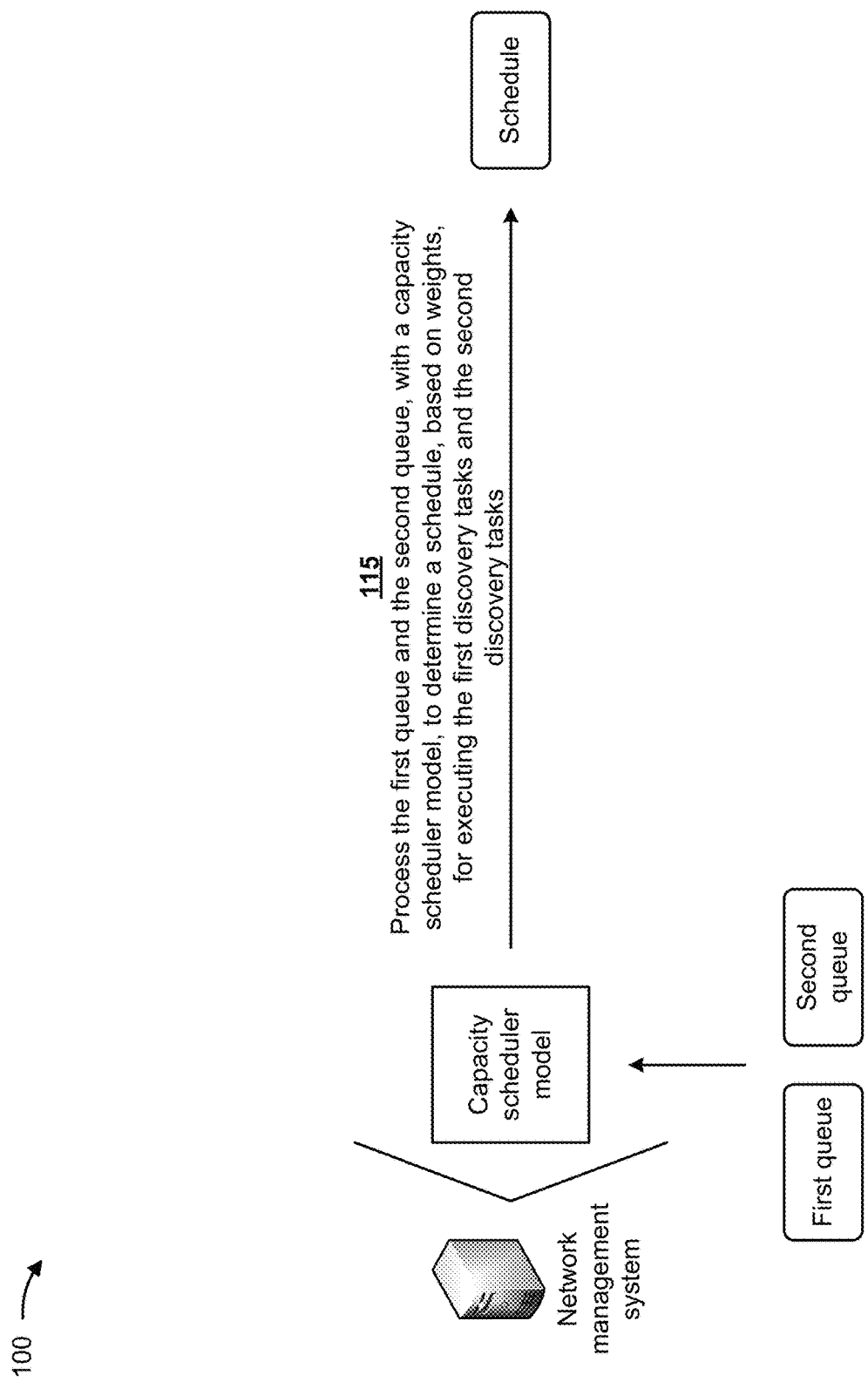

As shown in FIG. 1C, and by reference number 115, the network management system may process the first queue and the second queue, with a capacity scheduler model, to determine a schedule, based on weights, for executing the first discovery tasks and the second discovery tasks. Different networks may include different quantities of network devices. For example, a first network may include 1,000 resources associated with network devices, while a second network may include 60,000 resources associated with network devices. Thus, the network management system may utilize the capacity scheduler model to determine when to execute the first discovery tasks and/or the second discovery tasks, and whether to execute one or more of the first discovery tasks and/or the second discovery tasks in parallel or sequentially. Such capacity awareness may prevent the network management system from running out of computing resources or experiencing poor utilization of computing resources. The capacity scheduler model may enable the network management system to utilize capacity awareness.

The network management system may utilize the capacity scheduler model to assign weights to the first discovery tasks and the second discovery tasks based on quantities of the resources of the network devices associated with the first discovery tasks and the second discovery tasks. For example, the weights may be categorized as small for tasks associated with a first quantity of resources (e.g., 1-1,000 resources), as medium for tasks associated with a second quantity of resources (e.g., 1,000-20,000 resources), as large for tasks associated with a third quantity of resources (e.g., 20,000 or more resources), and/or the like. The network management system may utilize the capacity scheduler model to determine the schedule based on the weights assigned to the first discovery tasks and the second discovery tasks.

In some implementations, the network management system utilizes the capacity scheduler model to modify a capability of a network protocol (e.g., the network configuration protocol (NETCONF) that provides mechanisms to install, manipulate, and delete a configuration of network devices) to capture quantities of resources associated with the first discovery tasks and the second discovery tasks. NETCONF supports filters that enable receipt of portions of a configuration, such as a namespace selection, attribute match expressions, containment nodes, selection nodes, content match nodes, and/or the like. The filters may be enhanced with a count-query capability that enables the network management system to capture quantities of resources associated with the first discovery tasks and the second discovery tasks. The network management system may utilize the capacity scheduler model to determine the quantities of resources when a discovery task is available for execution (e.g., one of the first discovery tasks) to prevent out of memory issues. The count-query capability may modify a "get configuration" operation to accept the count parameter.

For example, the network management system may utilize the following request operation (e.g., a remote procedure call (RPC) request) to determine the quantities of resources:

<rpc message-id="101" xmlns="urn:ietf:params:xml:ns:netconf:base:1.0">
    <get-config>
    <source>
    <running/>
    </source>
    <filter type="subtree">
    <top xmlns="http://example.com/schema/1.2/config">
    <users query="count"/>
    </top>
    </filter>
    </get-config>
    </rpc>
    <rpc-reply message-id="101" xmlns="urn:ietf:params:xml:ns:netconf:base:1.0">
    <data>
    <top xmlns="http://example.com/schema/1.2/config">
    <users count="40">
    </users>
    </top>
    </data>
    </rpc-reply>

The network management system may receive a response (e.g., an RPC response) based on the request. If a network device can satisfy the request, the network device may provide a positive response (e.g., an RPC reply) that includes a data element with the results of the query. If the network device cannot satisfy the request, the network device may provide a negative response (e.g., an RPC error element) instead of the RPC reply.

The network management system may utilize the capacity scheduler model to initialize a total weight based on the quantity of network devices in the network, and to initialize a current weight of the first queue to zero. The network management system may identify the network devices to be discovered based on device type, and may identify the weights for the discovery tasks. If a network device supports the NETCONF count capability, the network management system may utilize the get configuration operation to determine a count for the network device. If a network device does not support the NETCONF count capability, the network management system may calculate the count for the network device.

The network management system may utilize the capacity scheduler model to create the first queue (e.g., a priority queue of discovery tasks to execute, where the priority is based on the weights), and to create the second queue (e.g., a queue of pending discovery tasks). If a network device is not dependent on any other network devices, the network management system may add a discovery task for the network device to the first queue. If a network device is dependent on one or more other network devices, the network management system may add a discovery task for the network device to the second queue. The network management system may check a current weight of a first discovery task in the first queue, and may create a thread for the first discovery task when the current weight and a task weight is less than the total weight. When execution of a first discovery task is completed, the network management system may update the current weight of the first discovery task and may update dependencies associated with a second discovery task. If the dependencies for the second discovery task are zero, the network management system may move the second discovery task from the second queue to the first queue (e.g., for execution).

Figure 1D:
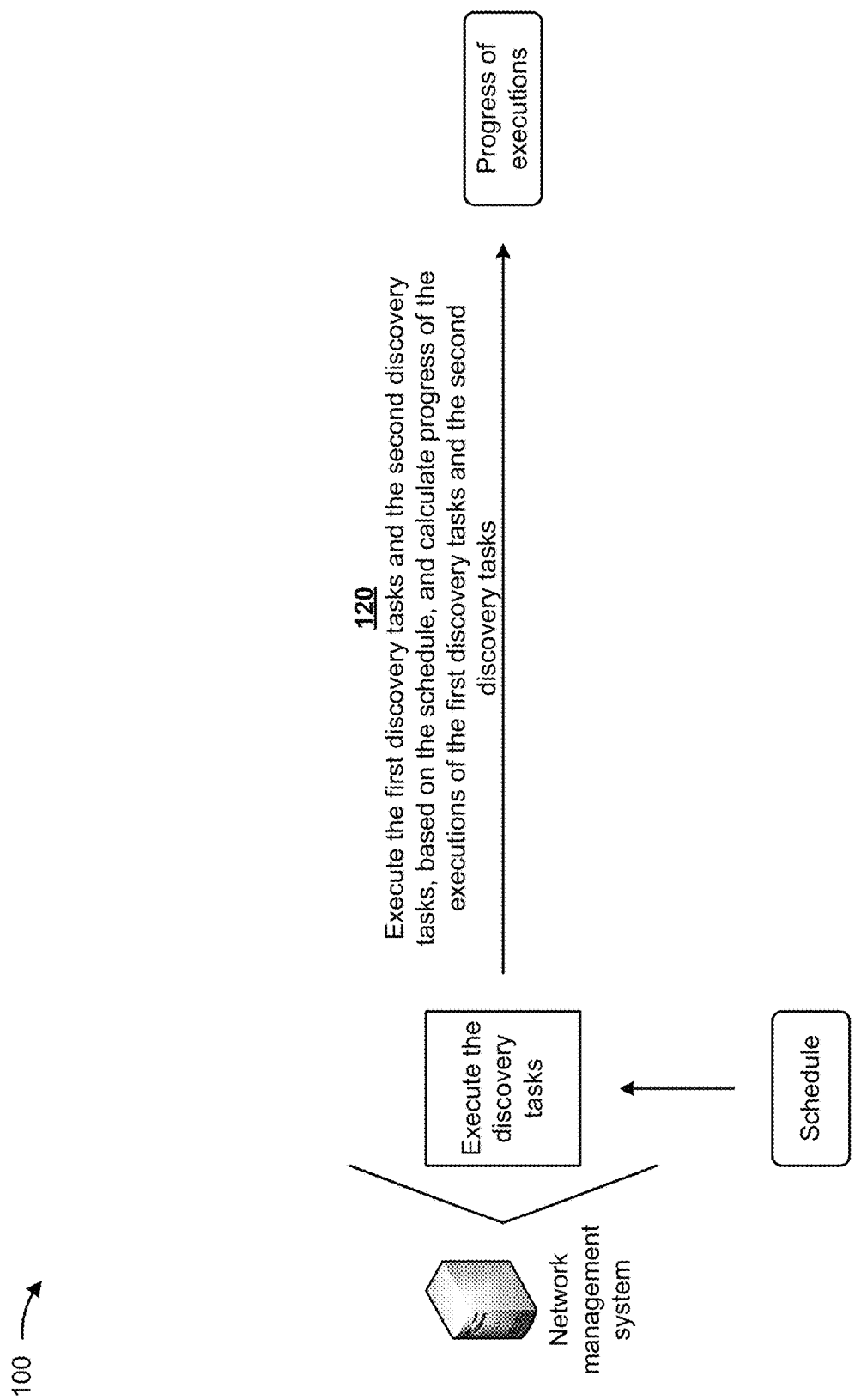

As shown in FIG. 1D, and by reference number 120, the network management system may execute the first discovery tasks and the second discovery tasks, based on the schedule, and may calculate progress of the executions of the first discovery tasks and the second discovery tasks. In some implementations, the network management system executes the first discovery tasks in the first queue, and moves the second discovery tasks from the second queue to the first queue based on execution of the first discovery tasks. The network management system may then execute the second discovery tasks moved from the second queue to the first queue. The network management system may execute two or more of the first discovery tasks in parallel or sequentially, and may execute two or more of the second discovery tasks in parallel or sequentially.

While the first discovery tasks and the second discovery tasks are being executed, the network management system may calculate the progress of the executions of the first discovery tasks and the second discovery tasks. In order to calculate the progress, the network management system may calculate a total weight of the first discovery tasks and the second discovery tasks, and may initialize a completed task weight to zero. When execution of a discovery task is completed, the network management system may add a current task weight of the completed discovery task to the completed task weight, and may calculate the progress based on the completed task weight and the total weight. In some implementations, the progress of the executions of the first discovery tasks and the second discovery tasks includes percentage complete values associated with the executions of the first discovery tasks and the second discovery tasks. For example, the network management system may calculate the progress as follows:

$$\text{Progress} = \frac{\text{Completed task weight}}{\text{Total weight}} \times 100.$$

Figure 1E:
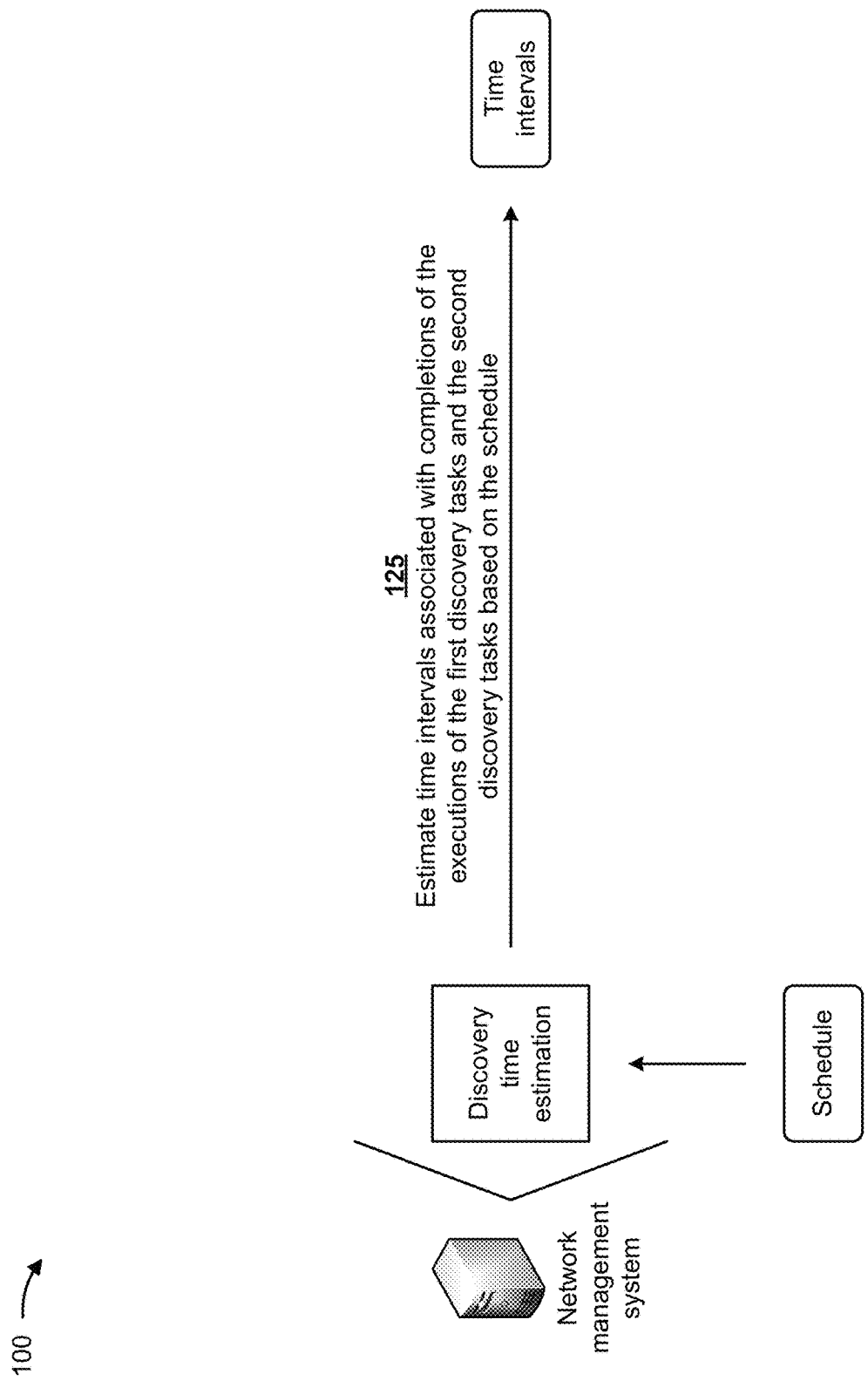

As shown in FIG. 1E, and by reference number 125, the network management system may estimate time intervals associated with completions of the executions of the first discovery tasks and the second discovery tasks based on the schedule. For example, the network management system may associate each of the first discovery tasks and each of the second discovery tasks with a time to complete interval based on the weights assigned to the first discovery tasks and the second discovery tasks. In some implementations, the network management system utilizes a variation of a sliding window model to estimate the time intervals.

The network management system may create an array to be used for the sliding window, and may create a time variable. The network management system may define a start position (e.g., a start of the sliding window) and an end position (e.g., an end of the sliding window). If the end position is less than the total quantity of discovery tasks, the current weight is less than the total weight, and the first queue is not empty, the network management system may select a discovery task from the first queue and may add the discovery task to the array. If the start position is less than or equal to the end position, the current weight is less than the total weight, and the first queue is not empty, the network management system may select a discovery task from the array and determine a task time associated with executing the discovery task. The network management system may add the task time to the total time (e.g., the estimated time interval) associated with the completion of the execution of the discovery task. The network management system may repeat the aforementioned steps for each of the discovery tasks to estimate the time intervals associated with the completions of the executions of the first discovery tasks and the second discovery tasks.

Figure 1F:
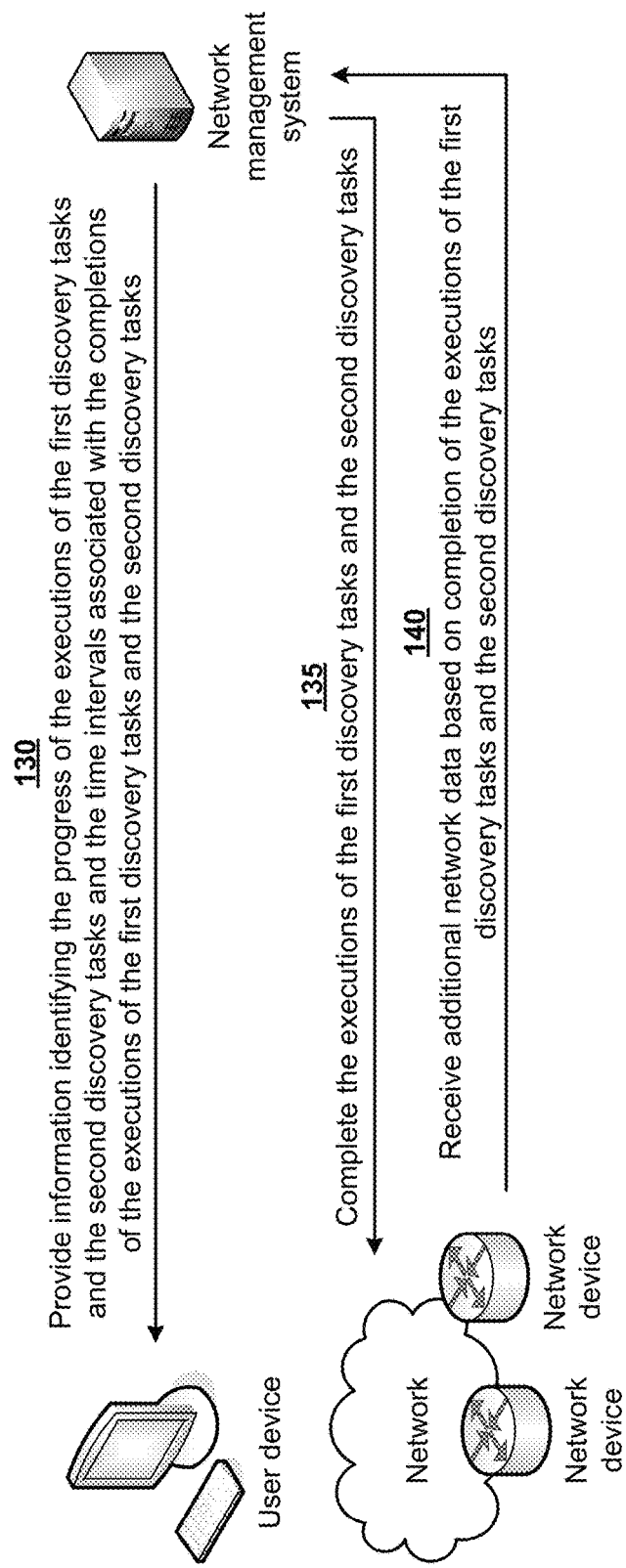

As shown in FIG. 1F, and by reference number 130, the network management system may provide, to a user device, information identifying the progress of the executions of the first discovery tasks and the second discovery tasks and the time intervals associated with the completions of the executions of the first discovery tasks and the second discovery tasks. The user device may receive the information identifying the progress and the time intervals, and may provide the information identifying the progress and the time intervals for display. In this way, an operator of the network management system may be informed about the progress and the remaining time associated with discovering the information about the network devices.

As further shown in FIG. 1F, and by reference number 135, the network management system may complete the executions of the first discovery tasks and the second discovery tasks. In some implementations, the network management system completes execution of the first discovery tasks in the first queue, and moves the second discovery tasks from the second queue to the first queue based on completion of the execution of the first discovery tasks. The network management system may then complete execution of the second discovery tasks moved from the second queue to the first queue. The network management system may execute two or more of the first discovery tasks in parallel or sequentially, and may execute two or more of the second discovery tasks in parallel or sequentially.

As further shown in FIG. 1F, and by reference number 140, the network management system may receive additional network data based on completion of the executions of the first discovery tasks and the second discovery tasks. The additional network data may include complete configurations of the network devices of the network, detailed data associated with the network devices, and/or the like. A first portion of the additional network data may be associated with resources of the network devices that are known to the network management system (e.g., the network management system may be privy to stored information about the known resources of the network devices). A second portion of the additional network data may be associated with resources of the network devices that are unknown to the network management system (e.g., newly discovered by the network management system). In some implementations, the network management system stores the additional network data in a data structure (e.g., a database, a table, a list, and/or the like) associated with the network management system.

Figure 1G:
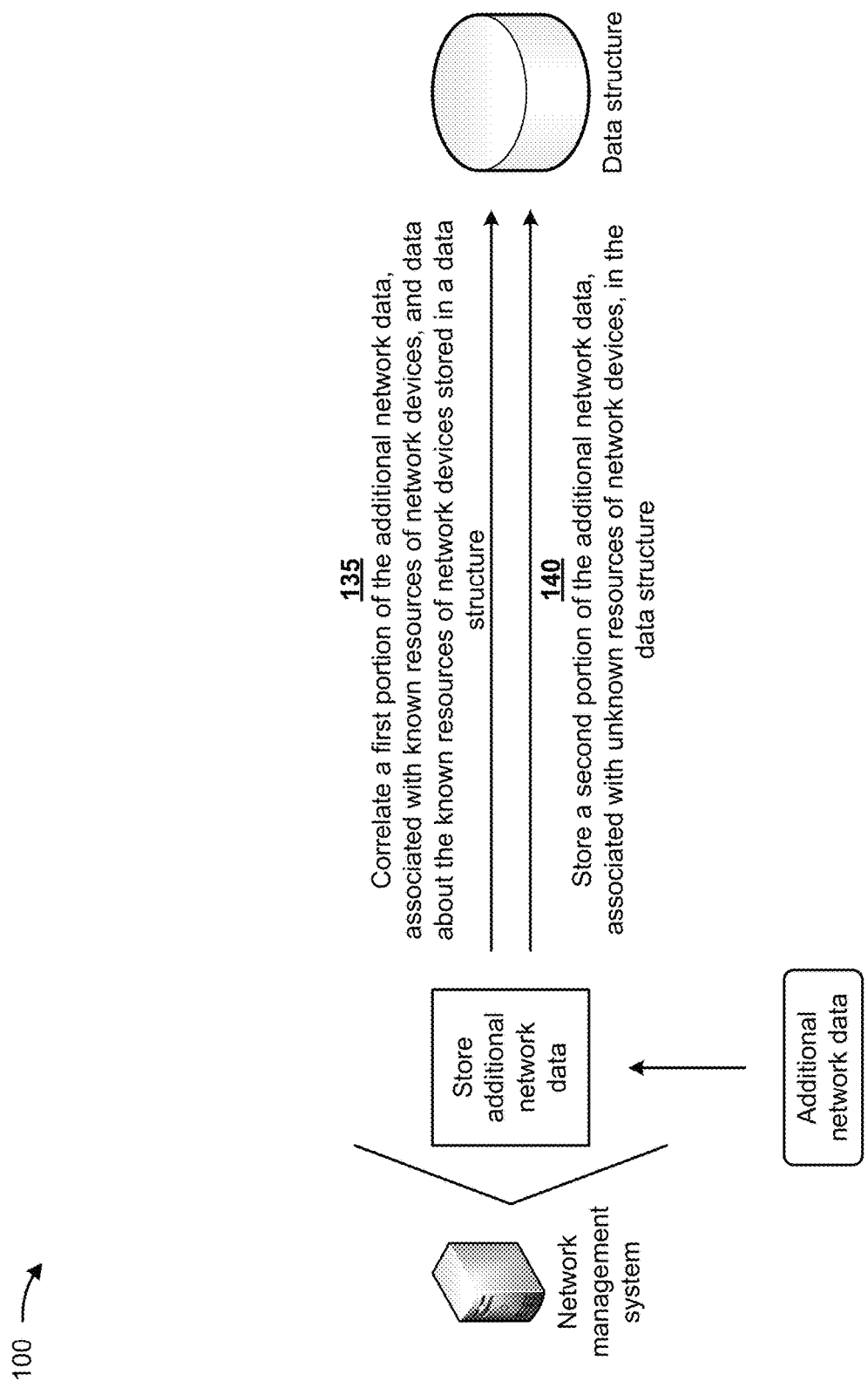

As shown in FIG. 1G, and by reference number 135, the network management system may correlate the first portion of the additional network data, associated with the known resources of the network devices, and data about the known resources of the network devices stored in the data structure. For example, the network management system may associate the stored data about the known resources of the network devices with the first portion of the additional network data.

As further shown in FIG. 1G, and by reference number 140, the network management system may store the second portion of the additional network data, associated with the unknown resources of the network devices, in the data structure. For example, the network management system may create new entries in the data structure for the second portion of the additional network data. In some implementations, the network management system maintains hashes for data, associated with the network devices, that is previously stored in the data structure, and calculates new hashes for the additional network data. The network management system may compare the hashes and the new hashes to identify new hashes that match the hashes and new hashes that fail to match the hashes. The network management system may correlate, in the data structure, the additional network data, associated with the new hashes that match the hashes, and data about the network devices associated with the hashes that match the new hashes. The network management system may store the additional network data, associated with the new hashes that fail to match the hashes, in the data structure (e.g., as new entries).

In this way, the network management system utilizes models for concurrently discovering network resources of network. The network management system may provide concurrent network resource discovery, and may schedule discovery tasks based on capacity requirements of the discovery tasks. The network management system may efficiently match and update the information about the network devices in a data structure, and may calculate a network resource discovery time associated with the discovery tasks. This, in turn, conserves computing resources, human resources, and/or the like that would otherwise have been wasted in determining the discovery tasks, executing the discovery tasks, storing the information about the network devices, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
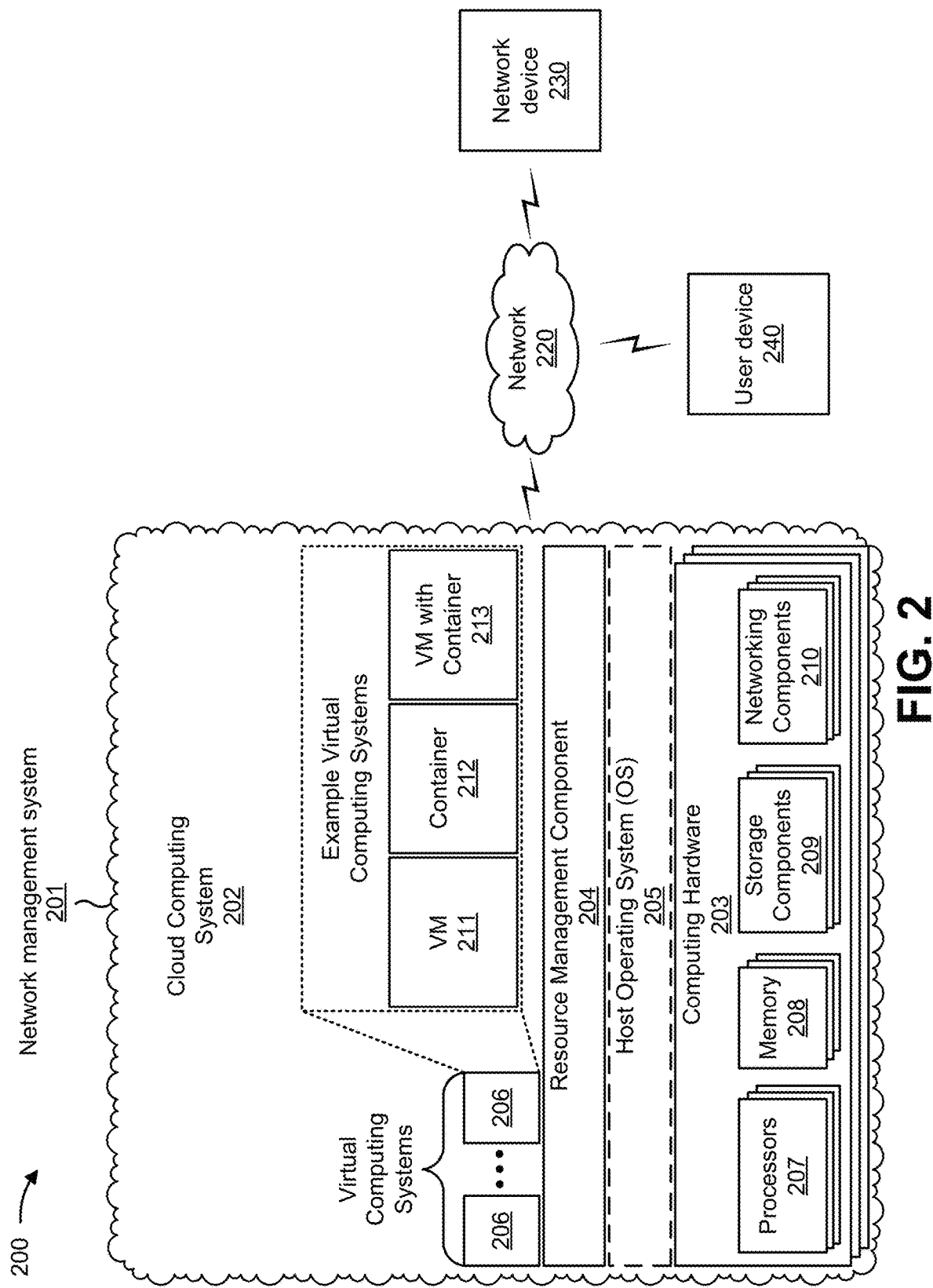
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network management system 201, which may include one or more elements of and/or may execute within a cloud computing system 202. The cloud computing system 202 may include one or more elements 203-213, as described in more detail below. As further shown in FIG. 2, environment 200 may include a network 220, a network device 230, and/or a user device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the network management system 201 may include one or more elements 203-213 of the cloud computing system 202, may execute within the cloud computing system 202, and/or may be hosted within the cloud computing system 202, in some implementations, the network management system 201 may not be cloud-based (e.g., may be implemented outside of a cloud computing system) or may be partially cloud-based. For example, the network management system 201 may include one or more devices that are not part of the cloud computing system 202, such as device 300 of FIG. 3, which may include a standalone server or another type of computing device. The network management system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Network device 230 includes one or more devices capable of receiving, processing, storing, routing, and/or providing traffic (e.g., a packet, other information or metadata, and/or the like) in a manner described herein. For example, network device 230 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 230 may include a gateway, a switch, a firewall, a hub, a bridge, a reverse proxy, a server (e.g., a proxy server, a cloud server, a data center server, and/or the like), a load balancer, and/or a similar device. In some implementations, network device 230 may be a physical device implemented within a housing, such as a chassis. In some implementations, network device 230 may be a virtual device implemented by one or more computing devices of a cloud computing environment or a data center. In some implementations, a group of network devices 230 may be a group of data center nodes that are used to route traffic flow through a network.

User device 240 includes one or more devices capable of receiving, generating, storing, processing, and/or providing information, as described elsewhere herein. User device 240 may include a communication device and/or a computing device. For example, user device 240 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 240 may communicate with one or more other devices of environment 300, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
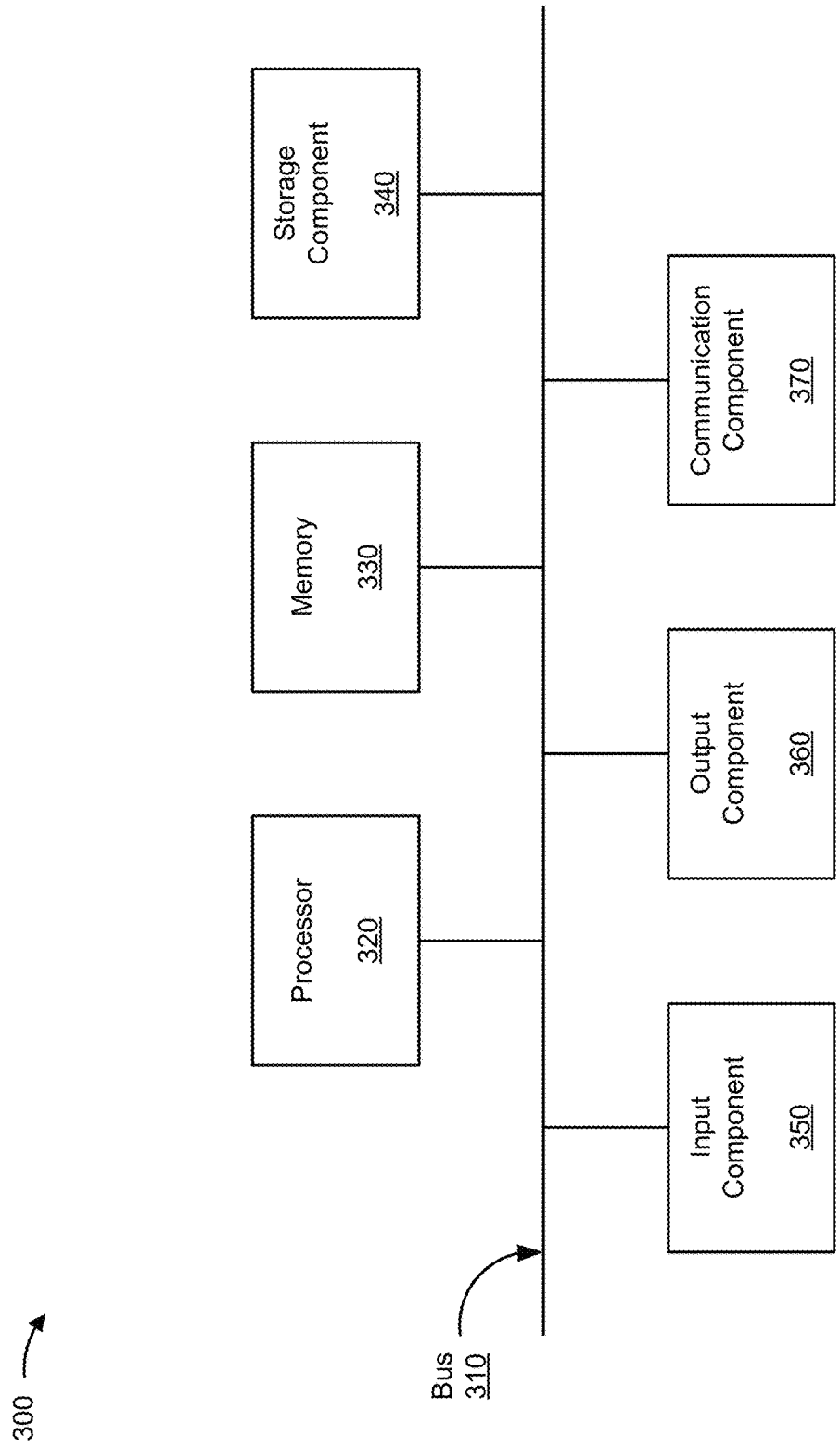
FIG. 3 is a diagram of example components of one or more devices of FIG. 2.

FIG. 3 is a diagram of example components of a device 300, which may correspond to network management system 201, network device 230, and/or user device 240. In some implementations, network management system 201, network device 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for utilizing models for concurrently discovering network resources of network. In some implementations, one or more process blocks of FIG. 4 may be performed by a device (e.g., network management system 201). In some implementations, one or more process blocks of FIG. 4 may be performed by another device or a group of devices separate from or including the device, such as a user device (e.g., user device 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving network data identifying data associated with network devices of a network (block 410). For example, the device may receive network data identifying data associated with network devices of a network, as described above.

As further shown in FIG. 4, process 400 may include processing the network data, with a concurrent discovery model, to determine a first queue identifying first discovery tasks to execute for the network devices and a second queue identifying second discovery tasks to execute for the network devices after the first discovery tasks (block 420). For example, the device may process the network data, with a concurrent discovery model, to determine a first queue identifying first discovery tasks to execute for the network devices and a second queue identifying second discovery tasks to execute for the network devices after the first discovery tasks, as described above.

As further shown in FIG. 4, process 400 may include processing the first queue and the second queue, with a capacity scheduler model, to determine a schedule, based on weights, for executing the first discovery tasks and the second discovery tasks (block 430). For example, the device may process the first queue and the second queue, with a capacity scheduler model, to determine a schedule, based on weights, for executing the first discovery tasks and the second discovery tasks, as described above.

As further shown in FIG. 4, process 400 may include executing the first discovery tasks and the second discovery tasks based on the schedule (block 440). For example, the device may execute the first discovery tasks and the second discovery tasks based on the schedule, as described above.

As further shown in FIG. 4, process 400 may include calculating progress of the executions of the first discovery tasks and the second discovery tasks (block 450). For example, the device may calculate progress of the executions of the first discovery tasks and the second discovery tasks, as described above.

As further shown in FIG. 4, process 400 may include estimating time intervals associated with completions of the executions of the first discovery tasks and the second discovery tasks (block 460). For example, the device may estimate time intervals associated with completions of the executions of the first discovery tasks and the second discovery tasks, as described above.

As further shown in FIG. 4, process 400 may include providing, to a user device, information identifying the progress of the executions of the first discovery tasks and the second discovery tasks and the time intervals associated with the completions of the executions of the first discovery tasks and the second discovery tasks (block 470). For example, the device may provide, to a user device, information identifying the progress of the executions of the first discovery tasks and the second discovery tasks and the time intervals associated with the completions of the executions of the first discovery tasks and the second discovery tasks, as described above.

Process 400 may include additional implementations, such as any single implementation or any combination of implementations described below and/or in connection with one or more other processes described elsewhere herein.

In a first implementation, process 400 includes completing the executions of the first discovery tasks and the second discovery tasks; receiving additional network data based on completions of the executions of the first discovery tasks and the second discovery tasks, wherein a first portion of the additional network data is associated with known resources of network devices, and wherein a second portion of the additional network data is associated with unknown resources of network devices; and storing the additional network data in a data structure.

In a second implementation, alone or in combination with the first implementation, storing the additional network data in the data structure includes correlating the first portion of the additional network data and data about the known resources of network devices stored in the data structure, and storing the second portion of the additional network data in the data structure.

In a third implementation, alone or in combination with one or more of the first and second implementations, storing the additional network data in the data structure includes maintaining hashes for data, associated with the network devices, that is previously stored in the data structure; calculating new hashes for the additional network data; comparing the hashes and the new hashes to identify new hashes that match the hashes and new hashes that fail to match the hashes; correlating, in the data structure, the additional network data, associated with the new hashes that match the hashes, and data about the network devices associated with the hashes that match the new hashes; and storing the additional network data, associated with the new hashes that fail to match the hashes, in the data structure.

In a fourth implementation, alone or in combination with one or more of the first through third implementations, processing the network data, with the concurrent discovery model, to determine the first queue identifying the first discovery tasks to execute for the network devices and the second queue identifying the second discovery tasks to execute for the network devices, includes generating a resource discovery dependency graph based on dependencies associated with the resources of the network devices; identifying the first discovery tasks in the resource discovery dependency graph; determining the first queue based on identifying the first discovery tasks; identifying the second discovery tasks in the resource discovery dependency graph; and determining the second queue based on identifying the second discovery tasks.

In a fifth implementation, alone or in combination with one or more of the first through fourth implementations, processing the first queue and the second queue, with the capacity scheduler model, to determine the schedule includes applying the weights to the first discovery tasks in the first queue and the second discovery tasks in the second queue; identifying a first set of the first discovery tasks and the second discovery tasks to execute in parallel based on the weights applied to the first discovery tasks and the second discovery tasks; identifying a second set of the first discovery tasks and the second discovery tasks to sequentially execute based on the weights applied to the first discovery tasks and the second discovery tasks; and determining the schedule based on the first set, the second set, the first queue, and the second queue.

In a sixth implementation, alone or in combination with one or more of the first through fifth implementations, calculating the progress of the executions of the first discovery tasks and the second discovery tasks includes identifying the weights associated with the first discovery tasks and the second discovery tasks; calculating completed task weights for the first discovery tasks and the second discovery tasks during the executions of the first discovery tasks and the second discovery tasks; and calculating the progress of the executions of the first discovery tasks and the second discovery tasks based on the weights and the completed task weights.

In a seventh implementation, alone or in combination with one or more of the first through sixth implementations, process 400 includes identifying the weights associated with the first discovery tasks and the second discovery tasks; calculating incomplete task weights for the first discovery tasks and the second discovery tasks during the executions of the first discovery tasks and the second discovery tasks; and estimating the time intervals associated with the completions of the executions of the first discovery tasks and the second discovery tasks based on the weights and the incomplete task weights.

In an eighth implementation, alone or in combination with one or more of the first through seventh implementations, process 400 includes determining a quantity of the network devices in the network based on a configuration setting associated with the network data, and providing information identifying the quantity of the network devices to the user device.

In a ninth implementation, alone or in combination with one or more of the first through eighth implementations, process 400 includes generating a network policy, and causing the network policy to be implemented in one or more of the network devices based on the additional network data.

In a tenth implementation, alone or in combination with one or more of the first through ninth implementations, process 400 includes generating a network service, and causing the network service to be implemented in one or more of the network devices based on the additional network data.

In an eleventh implementation, alone or in combination with one or more of the first through tenth implementations, the progress of the executions of the first discovery tasks and the second discovery tasks includes percentage complete values associated with the executions of the first discovery tasks and the second discovery tasks.

In a twelfth implementation, alone or in combination with one or more of the first through eleventh implementations, process 400 includes determining dependencies associated with the resources of the network devices, wherein a first portion of the network devices are associated with the dependencies, and wherein a second portion of the network devices are not associated with the dependencies; identifying the first discovery tasks for the first portion of the network devices, determining the first queue based on identifying the first discovery tasks, identifying the second discovery tasks for the second portion of the network devices, and determining the second queue based on identifying the second discovery tasks.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, network data identifying data associated with network devices of a network;
   processing, by the device, the network data, with a concurrent discovery model, to determine a first queue identifying first discovery tasks to execute for the network devices and a second queue identifying second discovery tasks to execute for the network devices after the first discovery tasks;
   processing, by the device, the first queue and the second queue, with a capacity scheduler model, to determine a schedule, based on weights, for executing the first discovery tasks and the second discovery tasks;
   executing, by the device, the first discovery tasks and the second discovery tasks based on the schedule;
   calculating, by the device, progress of the executions of the first discovery tasks and the second discovery tasks;
   estimating, by the device, time intervals associated with completions of the executions of the first discovery tasks and the second discovery tasks; and
   providing, by the device and to a user device, information identifying the progress of the executions of the first discovery tasks and the second discovery tasks and the time intervals associated with the completions of the executions of the first discovery tasks and the second discovery tasks.

2. The method of claim 1, further comprising:
   completing the executions of the first discovery tasks and the second discovery tasks;
   receiving additional network data based on completions of the executions of the first discovery tasks and the second discovery tasks,
      wherein a first portion of the additional network data is associated with known resources of network devices, and
      wherein a second portion of the additional network data is associated with unknown resources of network devices; and
   storing the additional network data in a data structure.

3. The method of claim 2, wherein storing the additional network data in the data structure comprises:
   correlating the first portion of the additional network data and data about the known resources of network devices stored in the data structure; and
   storing the second portion of the additional network data in the data structure.

4. The method of claim 2, wherein storing the additional network data in the data structure comprises:
   maintaining hashes for data, associated with the network devices, that is previously stored in the data structure;
   calculating new hashes for the additional network data;

comparing the hashes and the new hashes to identify new hashes that match the hashes and new hashes that fail to match the hashes;

correlating, in the data structure, the additional network data, associated with the new hashes that match the hashes, and data about the network devices associated with the hashes that match the new hashes; and storing the additional network data, associated with the new hashes that fail to match the hashes, in the data structure.

5. The method of claim 1, wherein processing the network data, with the concurrent discovery model, to determine the first queue identifying the first discovery tasks to execute for the network devices and the second queue identifying the second discovery tasks to execute for the network devices, comprises:

generating a resource discovery dependency graph based on dependencies associated with resources of the network devices;

identifying the first discovery tasks in the resource discovery dependency graph;

determining the first queue based on identifying the first discovery tasks;

identifying the second discovery tasks in the resource discovery dependency graph; and determining the second queue based on identifying the second discovery tasks.

6. The method of claim 1, wherein processing the first queue and the second queue, with the capacity scheduler model, to determine the schedule comprises:

applying the weights to the first discovery tasks in the first queue and the second discovery tasks in the second queue;

identifying a first set of the first discovery tasks and the second discovery tasks to execute in parallel based on the weights applied to the first discovery tasks and the second discovery tasks;

identifying a second set of the first discovery tasks and the second discovery tasks to sequentially execute based on the weights applied to the first discovery tasks and the second discovery tasks; and determining the schedule based on the first set, the second set, the first queue, and the second queue.

7. The method of claim 1, wherein calculating the progress of the executions of the first discovery tasks and the second discovery tasks comprises:

identifying the weights associated with the first discovery tasks and the second discovery tasks;

calculating completed task weights for the first discovery tasks and the second discovery tasks during the executions of the first discovery tasks and the second discovery tasks; and calculating the progress of the executions of the first discovery tasks and the second discovery tasks based on the weights and the completed task weights.

8. A device, comprising:
one or more memories; and
one or more processors to:
receive network data identifying data associated with network devices of a network;

process the network data, with a concurrent discovery model, to determine a first queue identifying first discovery tasks to execute for the network devices and a second queue identifying second discovery tasks to execute for the network devices after the first discovery tasks;

process the first queue and the second queue, with a capacity scheduler model, to determine a schedule, based on weights, for executing the first discovery tasks and the second discovery tasks;

execute the first discovery tasks and the second discovery tasks based on the schedule;

calculate progress of the executions of the first discovery tasks and the second discovery tasks;

estimate time intervals associated with completions of the executions of the first discovery tasks and the second discovery tasks;

provide, to a user device, information identifying the progress of the executions of the first discovery tasks and the second discovery tasks and the time intervals associated with the completions of the executions of the first discovery tasks and the second discovery tasks;

complete the executions of the first discovery tasks and the second discovery tasks;

receive additional network data based on completions of the executions of the first discovery tasks and the second discovery tasks; and store the additional network data in a data structure.

9. The device of claim 8, wherein the one or more processors, when estimating the time intervals associated with the completions of the executions of the first discovery tasks and the second discovery tasks, are to:

identify the weights associated with the first discovery tasks and the second discovery tasks;

calculate incomplete task weights for the first discovery tasks and the second discovery tasks during the executions of the first discovery tasks and the second discovery tasks; and estimate the time intervals associated with the completions of the executions of the first discovery tasks and the second discovery tasks based on the weights and the incomplete task weights.

10. The device of claim 8, wherein the one or more processors are further to:

determine a quantity of the network devices in the network based on a configuration setting associated with the network data; and provide information identifying the quantity of the network devices to the user device.

11. The device of claim 8, wherein the one or more processors are further to:

generate a network policy; and cause the network policy to be implemented in one or more of the network devices based on the additional network data.

12. The device of claim 8, wherein the one or more processors are further to:

generate a network service; and cause the network service to be implemented in one or more of the network devices based on the additional network data.

13. The device of claim 8, wherein the progress of the executions of the first discovery tasks and the second discovery tasks includes percentage complete values associated with the executions of the first discovery tasks and the second discovery tasks.

14. The device of claim 8, wherein the one or more processors, when processing the network data, with the concurrent discovery model, to determine the first queue identifying the first discovery tasks to execute for the network devices and the second queue identifying the second discovery tasks to execute for the network devices, are to:
  determine dependencies associated with resources of the network devices,
    wherein a first portion of the network devices are associated with the dependencies, and
    wherein a second portion of the network devices are not associated with the dependencies;
  identify the first discovery tasks for the first portion of the network devices;
  determine the first queue based on identifying the first discovery tasks;
  identify the second discovery tasks for the second portion of the network devices; and
  determine the second queue based on identifying the second discovery tasks.

15. A non-transitory computer-readable medium storing a set of instructions, the set of instructions comprising:
  one or more instructions that, when executed by one or more processors of a device, cause the device to:
    receive network data identifying data associated with network devices of a network;
    process the network data, with a concurrent discovery model, to determine a first queue identifying first discovery tasks to execute for the network devices and a second queue identifying second discovery tasks to execute for the network devices after the first discovery tasks;
    process the first queue and the second queue, with a capacity scheduler model, to determine a schedule, based on weights, for executing the first discovery tasks and the second discovery tasks;
    execute the first discovery tasks and the second discovery tasks based on the schedule;
    receive additional network data based on executing the first discovery tasks and the second discovery tasks,
      wherein a first portion of the additional network data is associated with known resources of network devices, and
      wherein a second portion of the additional network data is associated with unknown resources of network devices; and
    store the additional network data in a data structure.

16. The non-transitory computer-readable medium of claim 15, wherein the one or more instructions further cause the device to:
  calculate progress of the executions of the first discovery tasks and the second discovery tasks;
  estimate time intervals associated with completions of the executions of the first discovery tasks and the second discovery tasks; and
  provide, to a user device, information identifying the progress of the executions of the first discovery tasks and the second discovery tasks and the time intervals associated with the completions of the executions of the first discovery tasks and the second discovery tasks.

17. The non-transitory computer-readable medium of claim 16, wherein the one or more instructions, that cause the device to store the additional network data in the data structure, cause the device to:
  correlate the first portion of the additional network data and data about the known resources of network devices stored in the data structure; and
  store the second portion of the additional network data in the data structure.

18. The non-transitory computer-readable medium of claim 15, wherein the one or more instructions, that cause the device to process the network data, with the concurrent discovery model, to determine the first queue identifying the first discovery tasks to execute for the network devices and the second queue identifying the second discovery tasks to execute for the network devices, cause the device to:
  generate a resource discovery dependency graph based on dependencies associated with resources of the network devices;
  identify the first discovery tasks in the resource discovery dependency graph;
  determine the first queue based on identifying the first discovery tasks;
  identify the second discovery tasks in the resource discovery dependency graph; and
  determine the second queue based on identifying the second discovery tasks.

19. The non-transitory computer-readable medium of claim 15, wherein the one or more instructions, that cause the device to process the first queue and the second queue, with the capacity scheduler model, to determine the schedule, cause the device to:
  apply the weights to the first discovery tasks in the first queue and the second discovery tasks in the second queue;
  identify a first set of the first discovery tasks and the second discovery tasks to execute in parallel based on the weights applied to the first discovery tasks and the second discovery tasks;
  identify a second set of the first discovery tasks and the second discovery tasks to sequentially execute based on the weights applied to the first discovery tasks and the second discovery tasks; and
  determine the schedule based on the first set, the second set, the first queue, and the second queue.

20. The non-transitory computer-readable medium of claim 15, wherein the one or more instructions further cause the device to:
  determine a quantity of the network devices in the network based on a configuration setting associated with the network data; and
  provide information identifying the quantity of the network devices to a user device.

* * * * *